United States Patent
Oh

(10) Patent No.: US 6,459,456 B1
(45) Date of Patent: Oct. 1, 2002

(54) DIGITAL RECEIVER APPARATUS CAPABLE OF RECEIVING MULTIPLE CHANNELS AND HAVING DISPLAY FUNCTION CONTROL METHOD

(75) Inventor: Hun-sok Oh, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/419,897

(22) Filed: Oct. 18, 1999

(30) Foreign Application Priority Data

Oct. 17, 1998 (KR) ......................................... 1998-43440

(51) Int. Cl.⁷ ............................................. H04N 5/445
(52) U.S. Cl. ....................................... 348/564; 348/588
(58) Field of Search ................................. 348/564, 565, 348/588, 383, 569; 725/68, 131, 139, 151; H04N 5/445, 5/45, 5/50

(56) References Cited

U.S. PATENT DOCUMENTS

| 5,414,471 | A | * | 5/1995 | Saitoh et al. ................ 348/588 |
| 5,877,817 | A | * | 3/1999 | Moon .......................... 348/564 |
| 5,900,868 | A | * | 5/1999 | Duhault et al. .............. 348/564 |
| 5,900,916 | A | * | 5/1999 | Pauley ........................ 348/564 |
| 5,969,767 | A | * | 10/1999 | Ishikawa et al. ............ 348/564 |
| 6,115,080 | A | * | 9/2000 | Reitmeier ................... 348/564 |
| 6,243,645 | B1 | * | 6/2001 | Moteki et al. .............. 348/564 |

FOREIGN PATENT DOCUMENTS

JP          9-307825 A          11/1997

* cited by examiner

Primary Examiner—Sherrie Hsia
(74) Attorney, Agent, or Firm—Sughrue Mion, PLLC

(57) ABSTRACT

A digital receive apparatus capable of simultaneously receiving a plurality of channels and having a display function control method are provided. The digital receive apparatus capable of simultaneously receiving the plurality of channels according to the present invention selects a plurality of channels among received signals by a user interface according to a mode of displaying a plurality of screens, displays the plurality of selected channels, and controls the display function so that the same channels are not displayed simultaneously. Therefore, when the plurality of channels are received and are displayed using a double screen mode, it is possible to control the display function so that the same channels are not displayed on the left and right screens. Accordingly, it is possible to effectively perform the function of displaying the plurality of screens.

17 Claims, 5 Drawing Sheets

US 6,459,456 B1

DIGITAL RECEIVER APPARATUS CAPABLE OF RECEIVING MULTIPLE CHANNELS AND HAVING DISPLAY FUNCTION CONTROL METHOD

BACKGROUND OF THE INVENTION

1. Field of the Invention

The present invention relates to a receiver apparatus, and more particularly, to a digital receiver apparatus capable of simultaneously receiving multiple channels and a method for controlling a display function so that the same channels are not displayed in a mode of displaying a plurality of screens.

2. Description of the Related Art

The number of broadcast channels is increasing and a broadcast receivers for simultaneously receiving multiple broadcast channels are bing marketed. Such broadcast receivers include those having picture in picture (PIP) and double screen functions.

Also, broadcasting is changing from conventional analog broadcasting to digital broadcasting. Accordingly, a digital receiver apparatus for receiving a bit stream encoded by a high compression encoding scheme such as a moving picture expert group (MPEG) format, will be commonly used. For example, a digital receiver such as a digital television preferably has a function of simultaneously receiving two or more channels and displaying a plurality of screens such as those in the PIP and double screen functions. Also, it is preferable to control the display function so that the same screens are not displayed when a plurality of screens are simultaneously displayed.

SUMMARY OF THE INVENTION

To solve the above problem, it is an object of the present invention to provide a method for controlling a display function so that the same channels are not displayed in a digital receiver apparatus capable of simultaneously receiving multiple channels.

It is another object of the present invention to provide a digital receiver apparatus in which the same channels are prevented from being displayed simultaneously in a mode wherein a plurality of screens are displayed.

Accordingly, to achieve the first object, there is provided a display function control method for simultaneously receiving a plurality of channels and displaying the channels, the method comprising the steps of selecting a plurality of channels among received signals by a user interface, according to a mode of displaying a plurality of screens and displaying the plurality of selected channels, while controlling the display function so that the same channels are not displayed simultaneously on the screen.

To achieve the second object, there is provided a digital receive apparatus for simultaneously receiving a plurality of channels, the apparatus comprising a transport stream (TS) processor for extracting the A/V bit stream of the plurality of channels selected from an input signal according to the mode of displaying a plurality of screens, an A/V decoder for decoding the A/V bit stream of the plurality of selected channels and providing decoded A/V signals of the respective channels, a plurality-of-screens processor for processing the decoded A/V signals of the respective channels corresponding to the mode of displaying a plurality of screens, and a controller for controlling the extraction of the A/V bit stream of the selected channels, so that the channels currently selected by a user interface are not the same as the displayed channels.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Hereinafter, preferred embodiments of a digital receive apparatus capable of simultaneously receiving multiple channels and a display function control method according to the present invention will be described with reference to the attached drawings.

Figure 1:
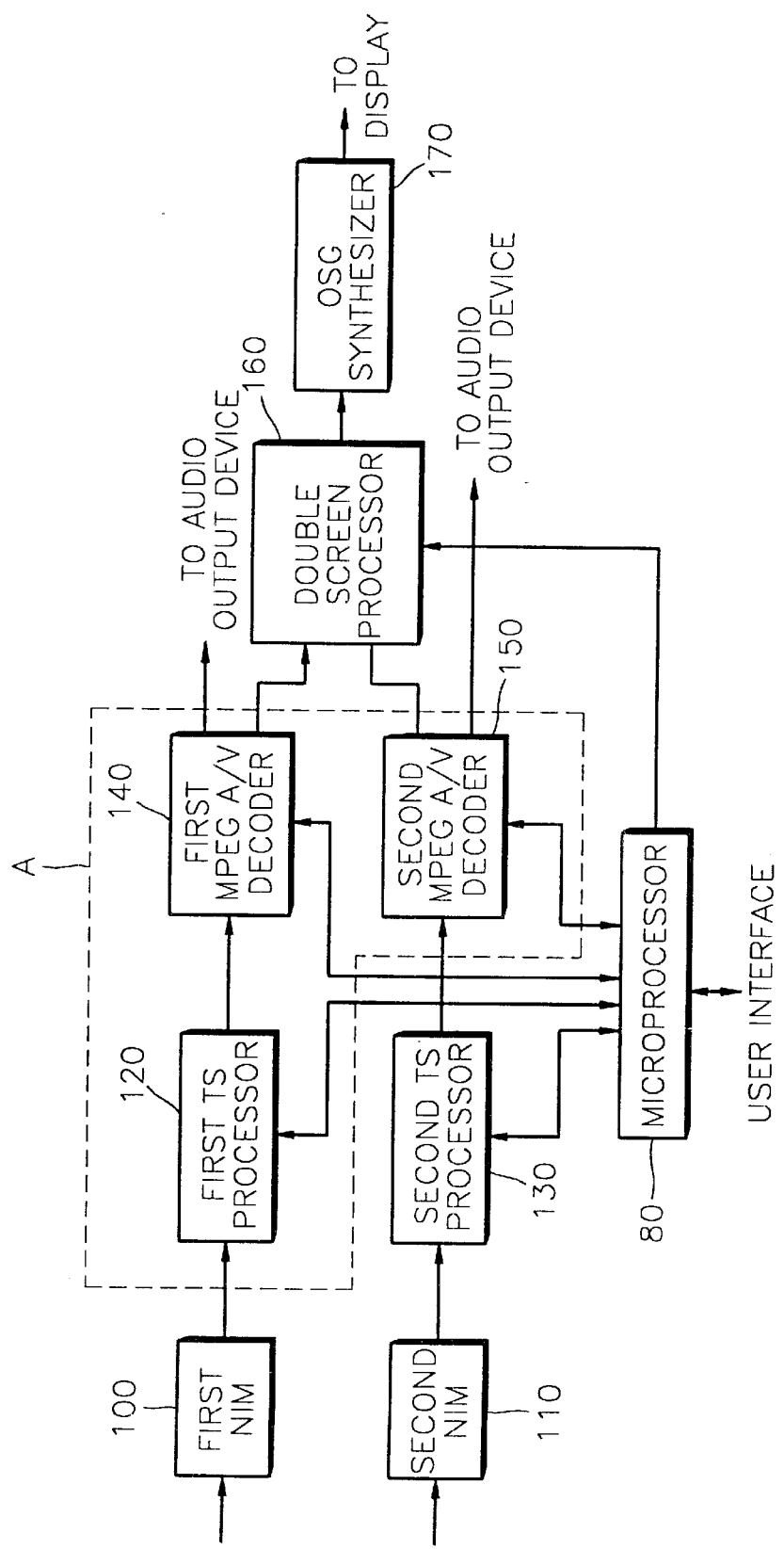
FIG. 1 is a block diagram illustrating an embodiment of a digital receiver apparatus of the present invention.

In FIG. 1 which is a block diagram of the digital receiver apparatus according to the present invention, many network interface modules (NIM) can exist in order to receive digital information compressed by a moving picture expert group (MPEG) format through various transmission channels such as a cable, a telephone line, a satellite, and a radio, such that an image compressed bit stream transmitted via various transmission channels can be received. In the present invention, one or more NIM can exist. However, a system with two NIMs 100 and 110 is used as an example.

A NIM for receiving a satellite signal includes an antenna, a low noise block down converter (LNB), a tuner, and a quadrature phase shift keying (QPSK) demodulator and an error correction decoder. Accordingly, NIMs suitable for the various transmission methods can exist.

In an embodiment of the present invention, an image decoding process is performed by simultaneously receiving the bit streams of two channels, and the recovered image of each of the two channels is displayed on the double screen in order to support the mode for displaying a plurality of screens, for example, the double screen function. Namely, signals received through the first and second NIMs 100 and 110 are provided as compression encoded bit streams. The form of the bit stream is a transport stream (TS) bit stream.

When the audio/video packet identifiers (PID) of the two channels selected according to the input of a double screen mode key by a user interface are output from a microprocessor 180, first and second TS processors 120 and 130 select TS of each of the two channels having the PIDs of the two selected channels, extract the A/V bit streams of the channels from the TS of each of the two channels, and transmit the extracted bit streams to a first MPEG A/V decoder 140 and a second MPEG A/V decoder 150. Here, the microprocessor 180 can be called a controller.

When the double screen mode key is selected, a screen is divided into two display areas. The screen of a currently selected channel (a second channel) is set as a right screen and the screen of a channel prior to the double screen mode (a first channel) is set as a left screen.

The first MPEG A/V decoder 140 decodes the A/V bit stream of the first channel, provides the analog audio signal of the restored first channel to an audio output device such as a speaker, and provides the analog image signal of the restored first channel to a double screen processor 160. The second MPEG A/V decoder 150 decodes the A/V bit stream of the second channel, provides the analog audio signal of the restored second channel to the audio output device, and provides the analog image signal of the restored second channel to the double screen processor 160.

The double screen processor 160 processes the image signal of the first channel and the image signal of the second channel in order to display them on the double screen according to a control signal with respect to the double screen mode supplied from the microprocessor 180. When the channel of the right screen currently selected by the user interface is the same as the channel of a left screen, an on screen graphic (OSG) synthesizer 170 provides a left channel signal provided from the double screen processor 160 to the display without change, synthesizes the right channel signal obtained by moving up or down by one channel with respect to the left channel with the graphic signal of a message "the same screens cannot be selected", and provides the result to the display.

Additionally, when the channel is converted, in the case that the currently selected channel of the left screen is the same as the channel of the right screen, the OSG synthesizer 170 provides the right channel signal to the display without change, synthesizes the left channel signal obtained by moving up or down by one channel with respect to the right channel with the graphic signal of the message "the same screens cannot be selected", and provides the result to the display.

The microprocessor 180 receives state information such as the arrival of each channel, for example, a program clock reference (PCR) from the first and second TS processor 120 and 130, provides an appropriate control signal with respect to the state information to the first and second TS processors 120 and 130, receives state information related to decoding from the first and second MPEG A/V decoders 140 and 150, and provides an appropriate control signal to the first and second MPEG A/V decoders 140 and 150 so that decoding is performed within a time given by an MPEG format according to the state information.

The microprocessor 180 controls the first and second TS processors 120 and 130 so that, when the channel of the left screen is the same as the channel of the right screen, the A/V bit stream of the left channel and the right channel are extracted by moving either the left or the right screen up or down by one channel. Namely, the microprocessor 180 prevents the channel of the left screen from being the same as the channel of the right screen in any case except for cases where channels are searched for, a screen is paused, and channels are automatically set.

Figure 2:
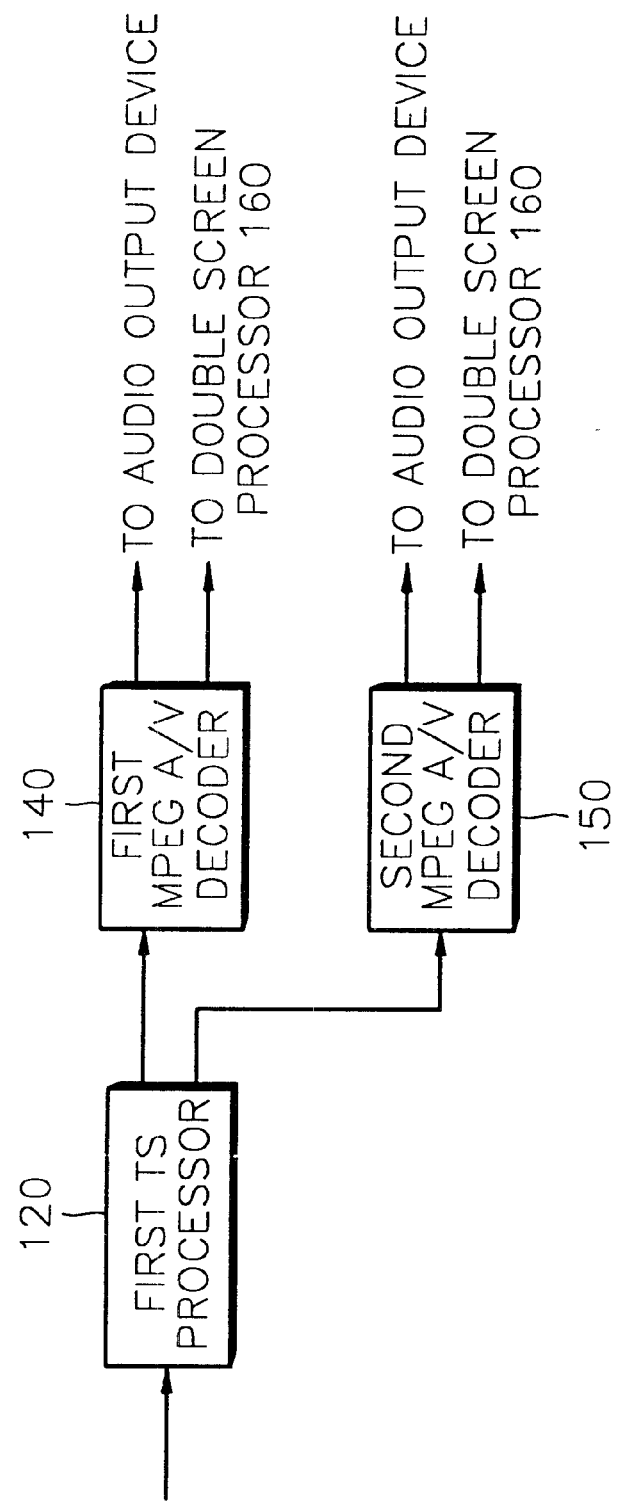
FIG. 2 shows another embodiment of the block A shown in FIG. 1.

FIG. 2 shows another embodiment of the block A shown in FIG. 1. Since a received signal is multiplexed into a plurality of programs in a channel in the case of a standard definition (SD) format, a user selects two programs from one of a plurality of channels. The same reference numerals denote the same elements.

In FIG. 2, the first TS processor 120 selects the A/V bit stream of the program (the first program) for the right screen and the currently selected program (second program) for the left screen from the TS of a certain channel provided from the first NIM 100 and provides the selected A/V bit stream to the first and second MPEG A/V decoders 140 and 150.

The first MPEG A/V decoder 140 decodes the A/V bit stream of the first program, provides the analog audio signal of the restored first program to the audio output device such as the speaker, and provides the analog image signal of the restored first program to the double screen processor 160. The second MPEG A/V decoder 150 decodes the A/V bit stream of the second program, provides the analog audio signal of the restored second program to the audio output device, and provides the analog image signal of the restored second program to the double screen processor 160. When the two programs are displayed in the double screen mode, in the case where the same screens are displayed because the same programs are selected, a program different from the currently selected program, for example, the next program is displayed, along with a message of, for example, "the same screens cannot be selected".

The first TS processor 120 was described with respect to FIG. 2. The A/V bit stream of two programs for the double screen mode, which are processed by the second TS processor 130 can be provided to the first and second MPEG A/V decoders 140 and 150. At this time, switching units can be further included in front of the first and second MPEG A/V decoders 140 and 150 so that the two selected programs are provided from the first TS processor 120 or the second TS processor 130 to the first and second MPEG A/V decoders 140 and 150.

Figure 3A:
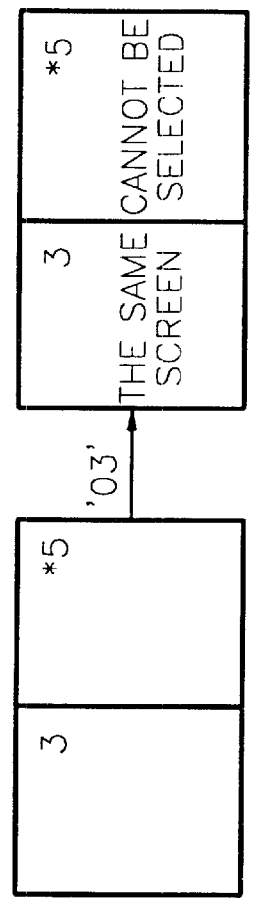
FIGS. 3A & 3B show double screens which are displayed when the same channels are selected by a number key according to the present invention.
Figure 3B:
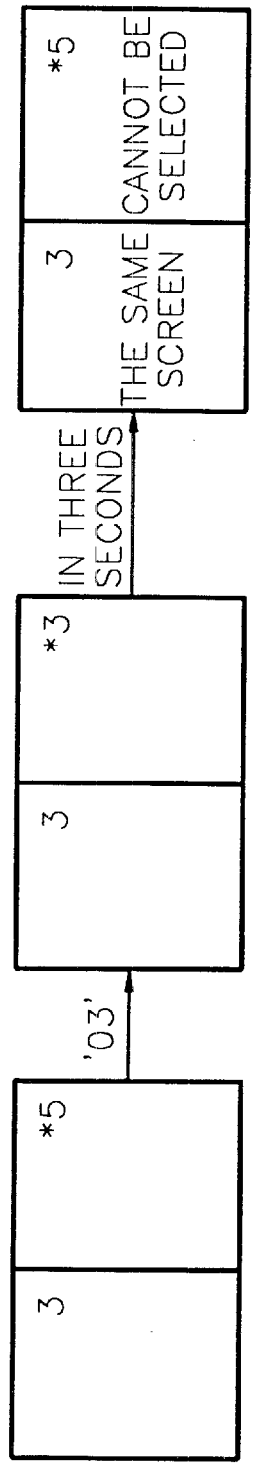

The case where the same channels are selected by the user interface according to the input of the number key on a remote controller or a keypad in the double screen mode, will be described with reference to FIGS. 3A & 3B. When the channel number of the left screen is 3 and the channel number of the right screen is 5, in the case where the channel whose number is 3 is selected by the user through the number key, as the channel to be displayed on the right screen, the microprocessor 180 determines that the current channel is the same as the channel of the left screen and controls the display function so that the previous channel number 5 and the message "the same screens cannot be selected" are displayed on the right screen as shown in FIG. 3A; or the channel number 3, which is the number of the channel displayed on the left screen, is displayed on the right screen for three seconds, after which the previous channel number 5 and the message "the same screens cannot be selected" are displayed on the right screen, as shown in FIG. 3B.

The case where the same channel is selected in the double screen mode, by a channel up/down key on the remote controller or the keypad will be described with reference to FIGS. 4A & 4B. When the same channel is selected by the input of the channel/up down key, in the case where there are memorized channels, the next memorized channel is displayed. In the case where there is no memorized channel, a channel obtained by increasing the selected channel by one is displayed.

Figure 4A:
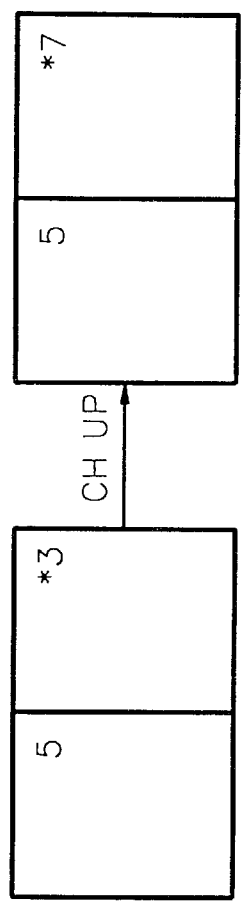
FIGS. 4A & 4B show double screens which are displayed when the same channels are selected by a channel up/down key according to the present invention.

Namely, when the channel number of the left screen is 5 and the channel number of the right screen is 3, in the case where the channel up key is input by the channel up/down key and the channels 3, 5, and 7 are memorized in the memory inside the microprocessor 180, the microprocessor 180 controls the display function so that the channel number 7, which is the next channel after the currently selected channel number 5, is displayed on the right screen as shown in FIG. 4A. In the case where channels are not memorized, the display function is controlled so that the channel number 4, obtained by increasing the previous channel by one, is displayed on the right screen as shown in FIG. 4B. When the channel up key is input, the display function is controlled so that the channel number 6 obtained by increasing the channel number 5 of the left screen by one, is displayed on the right screen.

Figure 4B:
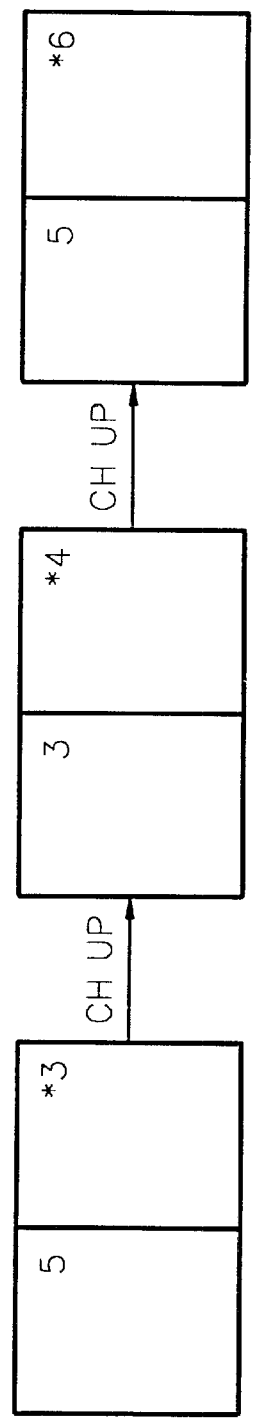

Also, when the right screen is not in the video mode, the channel of the left screen which is the same as the channel of the right screen should be changed as shown in FIGS. 4A and 4B. When the left screen is in the video mode, any channel can be selected. When the channel is changed, the left screen operates as mentioned above according to whether the right screen is in the video mode.

Figure 5A:
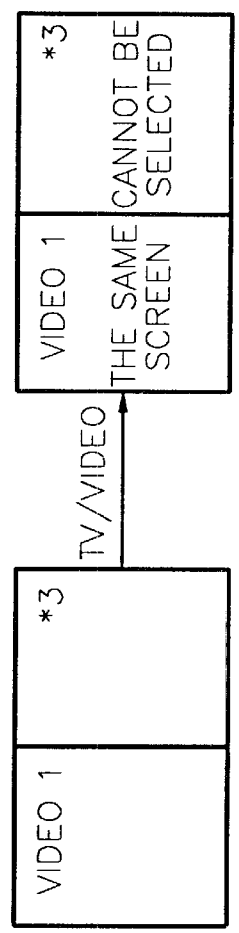
FIGS. 5A & 5B show double screens which are displayed according to a TV/VIDEO key input according to the present invention.
Figure 5B:
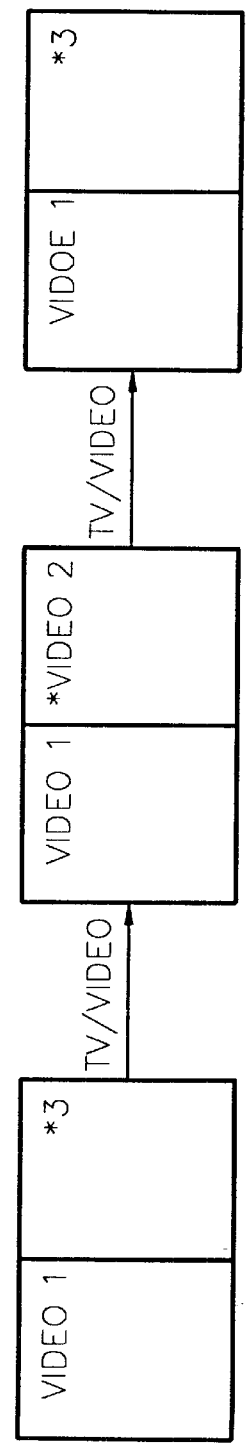

When only a first VCR (video 1) is connected, in the case wherein a video mode is set by the input of a TV/VIDEO key when the output of the first VCR (video 1) is displayed on the left screen and the channel number 3 is displayed on the right screen, the previous channel number 3 and the message "the same screens cannot be selected" is displayed on the left screen to which a second VCR (video 2) is not connected as shown in FIG. 5A.

When the first VCR (video 1) and the second VCR (video 2) are connected, in the case that the video mode is set by the input of the TV/VIDEO key when the output of the first VCR (video 1) is displayed on the left screen and the channel number 3 is displayed on the right screen, the display function is controlled so that the output of the second VCR (video 2) is displayed on the right screen. In the case wherein a TV mode is set by the input of the TV/VIDEO key, the display function is controlled so that the previously displayed channel number 3 is displayed on the right screen.

In the present invention, the same channels can mean the same programs, the same broadcast channels, and the same screens displayed in the video mode.

As mentioned above, according to the present invention, it is possible to prevent the left screen from being the same as the right screen by simultaneously receiving a plurality of channels using the double screen mode in the digital receiver apparatus capable of simultaneously receiving a plurality of channels, to thus effectively perform the function of displaying a plurality of screens.

What is claimed is:

1. A display function control method for simultaneously receiving a plurality of channels and displaying the channels, comprising the steps of:
   (a) selecting a plurality of channels from among received signals by using a user interface, according to a mode of displaying a plurality of screens; and
   (b) displaying the plurality of selected channels, while controlling the display function so that the same channels are not displayed on the screen simultaneously.

2. The method according to claim 1, wherein one of the plurality of channels selected in step (a) is advanced up or down and is displayed in step (b) when the channels selected in step (a) are the same.

3. The method according to claim 1, wherein one of the plurality of channels selected in step (a) is displayed as a previously memorized next channel in step (b) when the channels selected in step (a) are the same.

4. The method according to claim 1, wherein step (b) comprises the steps of:
   (b1) extracting the audio and video (A/V) bit stream of the respective channels from the transport stream (TS) of the plurality of selected channels;
   (b2) decoding the A/V bit stream of the respective extracted channels and providing the decoded A/V signals of the respective channels; and
   (b3) processing the decoded A/V signals of the respective channels in order to display the A/V signals according to the mode of displaying a plurality of screens.

5. The method according to claim 4, wherein step (b) further comprises the step of (b4) displaying an error message on the screen when the channel currently selected by a user interface in step (a) is the same as the plurality of displayed channels.

6. The method according to claim 1, wherein a plurality of programs are selected from the TS of one of the plurality of channels received according to the mode of displaying a plurality of screens in step (a).

7. The method according to claim 6, wherein step (b) further comprises the steps of:
   (b1) extracting the A/V bit stream of the plurality of selected programs;
   (b2) decoding the A/V bit stream of the respective extracted programs and providing the decoded A/V signals of the respective programs; and
   (b3) processing the decoded A/V signals of the respective programs in order to display the A/V signals according to the mode of displaying the plurality of screens.

8. The method according to claim 7, wherein step (b) comprises the step of (b4) displaying an error message on the screen when the program currently selected by the user interface in step (a) is the same as the plurality of displayed programs.

9. The method according to claim 1, wherein the selection of channels is performed by a method selected from the group consisting essentially of a number key, a channel up/down key, and a TV/VIDEO key.

10. The display function control method of claim 1, wherein in step (b), when one of the displayed channels is switched, the display function is controlled so that the same channels are not displayed on the screen simultaneously.

11. A digital receive apparatus for simultaneously receiving a plurality of channels, comprising:
    a transport stream (TS) processor for extracting an A/V bit stream of the plurality of channels selected from an input signal according to a mode of displaying a plurality of screens;
    an A/V decoder for decoding the A/V bit stream of the plurality of selected channels and providing decoded A/V signals of the respective channels;
    a plurality-of-screens processor for processing the decoded A/V lo signals of the respective channels corresponding to the mode of displaying a plurality of screens; and
    a controller for controlling the extraction of the A/V bit stream of the selected channels, so that the channels currently selected by a user interface are not the same as the displayed channels.

12. The digital receive apparatus according to claim 11, further comprising an on screen graphic (OSG) synthesizer for synthesizing an error message with the output of the plurality-of-screens processor when the channel currently selected by the user interface is the same as the plurality of displayed channels.

13. The digital receive apparatus according to claim 11, wherein the mode of displaying a plurality of screens is a double screen mode or a PIP mode.

14. The digital receive apparatus according to claim 11, wherein the controller controls the TS processor so that the A/V bit stream of a channel obtained by advancing up or down a certain channel is extracted when the channels selected by the user interface are the same.

15. The digital receive apparatus according to claim 11, wherein the controller controls the TS processor so that the A/V bit stream of a previously memorized next channel is extracted when the channels selected by the user interface are the same.

16. The digital receive apparatus according to claim 11, wherein the TS processor extracts the A/V bit stream of the plurality of programs selected from the TS of one of the plurality of channels according to the mode of displaying a plurality of screens and the plurality-of-screens processor displays the plurality of selected programs.

17. The digital receive apparatus according to claim 11, wherein the selection of channels is performed by a method selected from the group consisting essentially of a number key, a channel up/down key, and a TV/VIDEO key.

* * * * *